United States Patent
Huang (10) Patent No.: US 12,389,365 B2
(45) Date of Patent: Aug. 12, 2025

(54) METHOD FOR WIRELESS COMMUNICATION, TERMINAL DEVICE, AND NETWORK DEVICE

(71) Applicant: QUECTEL WIRELESS SOLUTIONS CO., LTD., Shanghai (CN)

(72) Inventor: Qufang Huang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/926,655

(22) Filed: Oct. 25, 2024

(65) Prior Publication Data

US 2025/0175936 A1 May 29, 2025

Related U.S. Application Data

(63) Continuation of application No. PCT/CN2023/134790, filed on Nov. 28, 2023.

(51) Int. Cl.
*H04W 64/00* (2009.01)
*H04L 5/00* (2006.01)
*H04W 84/06* (2009.01)

(52) U.S. Cl.
CPC ......... *H04W 64/003* (2013.01); *H04L 5/0048* (2013.01); *H04W 84/06* (2013.01)

(58) Field of Classification Search
CPC .... H04W 64/003; H04W 84/06; H04L 5/0048
See application file for complete search history.

(56) References Cited

U.S. PATENT DOCUMENTS

| 6,078,286 A * | 6/2000 | Gonzales | H04B 7/18513 342/359 |
| 9,989,644 B2 * | 6/2018 | Johnson | G01S 19/071 |
| 12,063,099 B2 * | 8/2024 | Xu | H04B 7/18541 |

(Continued)

FOREIGN PATENT DOCUMENTS

| CN | 116980063 A | 10/2023 |
| CN | 117014974 A | 11/2023 |
| CN | 117044363 A | 11/2023 |

OTHER PUBLICATIONS

Apple, "Way Forward for NTN Ephemeris Discussions for Pre-compensation, Idle Mode and Connected Mode Procedures," 3GPP TSG RAN WG2 #114-e, R2-2105116, e-Meeting, May 19-May 28, 2021, 6 pages.

(Continued)

*Primary Examiner* — Kabir A Timory
(74) *Attorney, Agent, or Firm* — Fish & Richardson P.C.

(57) ABSTRACT

A method for wireless communication, a terminal device, and a network device are provided. One example method includes: receiving first information, wherein the first information indicates ephemeris information of a second satellite, the ephemeris information of the second satellite comprises a first reference instant, and the first reference instant is inferred from time information of a first cell, or the first reference instant is associated with an absolute instant, wherein the first cell is a serving cell of the terminal device, the first cell is associated with a first satellite that currently serves the first cell and the second satellite that is to serve the first cell after the first satellite.

19 Claims, 5 Drawing Sheets (56) References Cited

U.S. PATENT DOCUMENTS

2022/0109496 A1    4/2022  Shrestha et al.

OTHER PUBLICATIONS

Huawei, "Maintenance on solutions for NR to support NTN," 3GPP TSG-RAN WG1 Meeting #109-e, R1-2203088, e-Meeting, May 9-20, 2022, 11 pages.
International Search Report and Written Opinion in International Appln. No. PCT/CN2023/134790, mailed on Aug. 12, 2024, 16 pages (with machine English translation).

* cited by examiner

METHOD FOR WIRELESS COMMUNICATION, TERMINAL DEVICE, AND NETWORK DEVICE

CROSS-REFERENCE TO RELATED APPLICATIONS

This application is a continuation of International Application No. PCT/CN2023/134790, filed on Nov. 28, 2023, the disclosure of which is hereby incorporated by reference in its entirety.

TECHNICAL FIELD

The present application relates to the field of communications technologies, and more specifically, to a method for wireless communication, a terminal device, and a network device.

BACKGROUND

A terminal device that does not move may by served with shift satellites. In a related technology, the terminal device is provided with ephemeris information of a satellite that is to serve the terminal device subsequently. Therefore, how to indicate, to the terminal device, the ephemeris information of the satellite that is to serve the terminal device subsequently is a problem that to be resolved.

SUMMARY

The present application provides a method for wireless communication, a terminal device, and a network device. Various aspects involved in the present application are described below.

According to a first aspect, a method for wireless communication is provided. The method includes: receiving, by a terminal device, first information, where the first information indicates ephemeris information of a second satellite, the ephemeris information of the second satellite includes a first reference instant, and the first reference instant is inferred from time information of a first cell, or the first reference instant is associated with an absolute instant, where the first cell is a serving cell of the terminal device, a first satellite is currently serving the first cell, and the second satellite is to serve the first cell subsequently.

According to a second aspect, a method for wireless communication is provided. The method includes: transmitting, by a network device, first information to a terminal device, where the first information indicates ephemeris information of a second satellite, the ephemeris information of the second satellite includes a first reference instant, and the first reference instant is inferred from time information of a first cell, or the first reference instant is associated with an absolute instant, where the first cell is a serving cell of the terminal device, a first satellite is currently serving the first cell, and the second satellite is to serve the first cell subsequently.

According to a third aspect, a terminal device is provided. The terminal device includes: a first receiving unit, receiving first information, where the first information indicates ephemeris information of a second satellite, the ephemeris information of the second satellite includes a first reference instant, and the first reference instant is inferred from time information of a first cell, or the first reference instant is associated with an absolute instant, where the first cell is a serving cell of the terminal device, a first satellite is currently serving the first cell, and the second satellite is to serve the first cell subsequently.

According to a fourth aspect, a network device is provided. The network device includes: a first transmitting unit, transmitting first information to a terminal device, where the first information indicates ephemeris information of a second satellite, the ephemeris information of the second satellite includes a first reference instant, and the first reference instant is inferred from time information of a first cell, or the first reference instant is associated with an absolute instant, where the first cell is a serving cell of the terminal device, a first satellite is currently serving the first cell, and the second satellite is to serve the first cell subsequently.

According to a fifth aspect, a terminal device is provided, and includes a processor and a memory. The memory is configured to store one or more computer programs, and the processor is configured to invoke a computer program in the memory to cause the terminal device to perform some or all of the steps in the method according to the first aspect.

According to a sixth aspect, a network device is provided, and includes a processor, a memory, and a transceiver. The memory is configured to store one or more computer programs. The processor is configured to invoke a computer program in the memory to cause the network device to perform some or all of the steps in the method according to the second aspect.

According to a seventh aspect, an embodiment of the present application provides a communications system. The system includes the foregoing terminal device and/or the foregoing network device. In another possible design, the system may further include another device that interacts with the terminal device or the network device in the solutions provided in embodiments of the present application.

According to an eighth aspect, an embodiment of the present application provides a computer-readable storage medium. The computer-readable storage medium stores a computer program, and the computer program causes a terminal device and/or a network device to perform some or all of the steps in the method according to the foregoing aspects.

According to a ninth aspect, an embodiment of the present application provides a computer program product. The computer program product includes a non-transitory computer-readable storage medium storing a computer program, and the computer program is operable to cause a terminal device and/or a network device to perform some or all of the steps in the method according to the foregoing aspects. In some implementations, the computer program product may be a software installation package.

According to a tenth aspect, an embodiment of the present application provides a chip. The chip includes a memory and a processor, and the processor may invoke a computer program from the memory and run the computer program, to implement some or all of the steps in the method according to the foregoing aspects.

In embodiments of the present application, the reference instant in the ephemeris information of the new satellite is inferred from the time information of the first cell (that is, a serving cell of the terminal device) corresponding to the old satellite. Alternatively, the reference instant in the ephemeris information of the new satellite is indicated by the absolute instant. In this way, the terminal device can obtain the ephemeris information of the new satellite before the new satellite provides coverage, and can transmit information through the new satellite immediately after the new satellite provides coverage, thereby helping to shorten communication interruption.

DETAILED DESCRIPTION OF THE EMBODIMENTS

The technical solutions in the present application are described below with reference to the accompanying drawings.

Communications System

Figure 1:
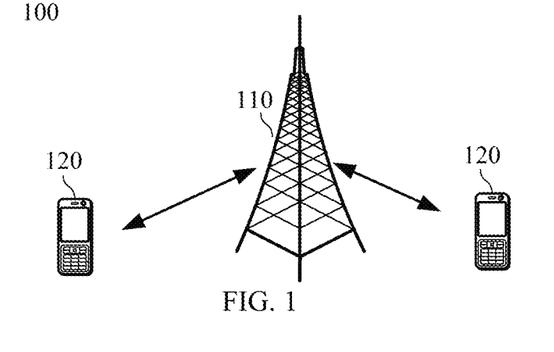
FIG. 1 is a schematic diagram of a wireless communications system to which an embodiment of the present application is applied.

FIG. 1 shows a wireless communications system 100 to which an embodiment of the present application is applied. The wireless communications system 100 may include a communications device. The communications device may include a network device 110 and terminal devices 120. The network device 110 may be a device that communicates with the terminal devices 120.

FIG. 1 illustratively shows one network device and two terminals. Optionally, the wireless communications system 100 may include a plurality of network devices, and another quantity of terminal devices may be included in a coverage range of each network device, which is not limited in embodiments of the present application.

Optionally, the wireless communications system 100 may further include another network entity such as a network controller or a mobility management entity, which is not limited in embodiments of the present application.

It should be understood that the technical solutions of embodiments of the present application may be applied to various communications systems, such as a 5th generation (5G) system or new radio (NR), a long-term evolution (LTE) system, an LTE frequency division duplex (FDD) system, and LTE time division duplex (TDD). The technical solutions provided in the present application may further be applied to a future communications system, such as a 6th generation mobile communications system or a satellite communications system.

The terminal device in embodiments of the present application may also be referred to as a user equipment (UE), an access terminal, a subscriber unit, a subscriber station, a mobile site, a mobile station (MS), a mobile terminal (MT), a remote station, a remote terminal, a mobile device, a user terminal, a terminal, a wireless communications device, a user agent, or a user apparatus. The terminal device in embodiments of the present application may be a device providing a user with voice and/or data connectivity and capable of connecting people, objects, and machines, such as a handheld device or vehicle-mounted device having a wireless connection function. The terminal device in embodiments of the present application may be a mobile phone, a tablet computer, a notebook computer, a palmtop computer, a mobile internet device (MID), a wearable device, a virtual reality (VR) vehicle, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in smart city, a wireless terminal in smart home, or the like. Optionally, the UE may be configured to function as a base station. For example, the UE may act as a scheduling entity, which provides a sidelink signal between UEs in vehicle-to-everything (V2X), device-to-device (D2D), or the like. For example, a cellular phone and a vehicle communicate with each other through a sidelink signal. A cellular phone and a smart home device communicate with each other, without the relay of a communication signal through a base station.

The network device in embodiments of the present application may be a device configured to communicate with a terminal device. The network device may further include an access network device. The access network device may provide communication coverage for a specific geographic area, and may communicate with a terminal device 120 located in the coverage area. The access network device may also be referred to as a radio access network device, a base station, or the like. The access network device in embodiments of the present application may be a radio access network (RAN) node (or device) that connects the terminal device to a wireless network. The access network device may broadly cover following various names, or may be replaced with following names, such as a NodeB, an evolved NodeB (eNB), a next generation NodeB (gNB), a relay station, a transmitting and receiving point (TRP), a transmitting point (TP), a master eNodeB (MeNB), a secondary eNodeB (SeNB), a multi-standard radio (MSR) node, a home base station, a network controller, an access node, a radio node, an access point (AP), a transmission node, a transceiver node, a baseband unit (BBU), a remote radio unit (RRU), an active antenna unit (AAU), a remote radio head (remote radio head, RRH), a central unit (CU), a distributed unit (DU), a positioning node, and the like. The base station may be a macro base station, a micro base station, a relay node, a donor node, or the like, or a combination thereof. Alternatively, the base station may be a communications module, a modem, or a chip disposed in the device or the apparatus described above. Alternatively, the base station may be a mobile switching center, a device that functions as a base station in D2D, V2X, and machine-to-machine (M2M) communication, a network-side device in a 6G network, a device that functions as a base station in a future communications system, or the like. The base station may support networks of a same access technology or different access technologies. A specific technology and a specific device form used by the access network device are not limited in embodiments of the present application.

The base station may be stationary, or may be mobile. For example, a helicopter or an unmanned aerial vehicle may be configured to function as a mobile base station, and one or more cells may move depending on a location of the mobile base station. In another example, a helicopter or an unmanned aerial vehicle may be configured to serve as a device in communication with another base station.

A communications device involved in a wireless communications system may include not only an access network device and a terminal device, but also a core network element. The core network element may be implemented by using a device, that is, the core network element is a core network device. It may be understood that the core network device may alternatively be a network device.

The core network element in embodiments of the present application may include a network element that processes and forwards signaling and data from a user. For example, the core network device may include a core network access and mobility management function (AMF), a session management function (SMF), a user plane gateway, a location management function (LMF), and other core network devices. The user plane gateway is typically located on a network side, and may be a server having functions such as mobility management, routing, and forwarding of user plane data, such as a serving gateway (SGW), a packet data network gateway (PGW), or a user plane function (UPF). Certainly, a core network may further include another network element. Examples are not listed here one by one.

In some deployments, the network device in embodiments of the present application may be a CU or a DU, or the network device includes a CU and a DU. The gNB may further include an AAU.

The network device and the terminal device may be deployed on land indoors or outdoors, handheld, or vehicle-mounted, may be deployed on a water surface, or may be deployed on a plane, a balloon, or a satellite in the air. In the embodiments of the present application, a scenario where the network device and the terminal device are located is not limited.

It should be understood that all or some of the functions of the communications device in the present application may also be implemented by software functions running on hardware, or by virtualization functions instantiated on a platform (i.e., a cloud platform).

Non-Terrestrial Network (NTN)

In a related technology, a base station for a cellular communication network may be built at a relatively high position above the ground, such as on rooftops or hilltops, to cover a larger area. A radius of a coverage range of the base station may range from several hundred meters to 100 kilometers. The coverage range may depend on a frequency band. For example, a base station operating in a low frequency band (for example, 700 MHz) may have a larger coverage range. A base station operating in a high frequency band (for example, 24 GHz) may have a smaller coverage range. In urban areas or suburbs with a relatively high population density, if such ground-based base stations are used, a relatively large quantity of terminal devices may be included within a coverage range of each base station. Therefore, in urban areas or suburbs, coverage of such ground-based base stations is highly efficient. However, to achieve coverage, even in rural areas with a relatively low population density, operators must establish a base station every certain distance (for example, 100 kilometers). Therefore, using such ground-based base stations for coverage in rural areas may have problems of inefficiency and high costs. In addition, with continuous development of the cellular communication network and advancement in technologies such as the internet of things, there is also an increasing demand for coverage in inaccessible areas. For example, the cellular communication network is required to monitor operation of oil pipelines in desert areas and provide communication support for seagoing freighters on the sea. However, the foregoing ground-based base stations cannot support such a scenario.

For the foregoing problems, NTN communication has emerged. NTN communication may be implemented based on satellites or other non-terrestrial communications devices. Therefore, in some embodiments, NTN communication may also be referred to as satellite communication.

Based on a deployment location of a wireless network device, NTN communication may operate in two modes: a bent-pipe mode and a regenerative mode.

Figure 2A:
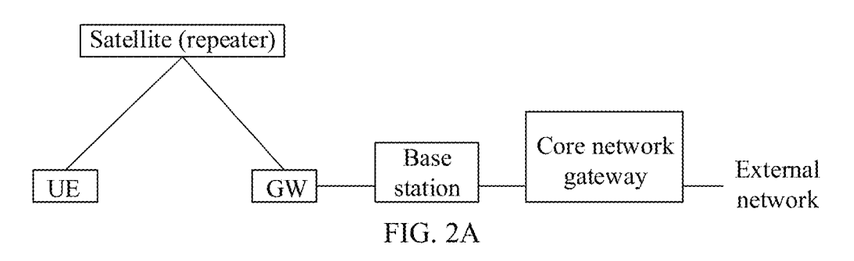
FIG. 2A is a schematic diagram of NTN communication in a bent-pipe mode.

FIG. 2A is a schematic diagram of NTN communication in the bent-pipe mode. As shown in FIG. 2A, in the bent-pipe mode, a base station is deployed on the ground, and a satellite may serve as a repeater. For downlink communication, a downlink signal transmitted by the base station is transmitted to the satellite through a gateway (GW). The downlink signal is then transmitted to a terminal device on the ground through the special repeater, that is, the satellite. For uplink communication, an uplink signal transmitted by a terminal is transmitted to the gateway on the ground through the special repeater, that is, the satellite, and is then transmitted to the base station. The base station may transmit the uplink signal to an external network by using a core network gateway.

Figure 2B:
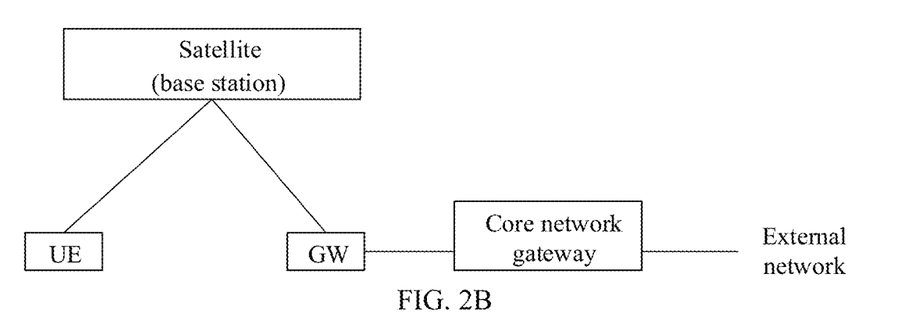
FIG. 2B is a schematic diagram of NTN communication in a regenerative mode.

FIG. 2B is a schematic diagram of NTN communication in the regenerative mode. As shown in FIG. 2B, in the regenerative mode, a base station is deployed on a satellite. A core network element performs, through a gateway, data transmission with the base station carried on the satellite. A terminal device directly performs data transmission with the base station on the satellite.

Unlike a terrestrial communications system, a satellite may continuously move along a predetermined orbit. In this case, ground coverage of a cell corresponding to the satellite may be mobile or fixed. Depending on whether cells are mobile, the cell corresponding to the satellite may have two basic modes: a mobile cell and a fixed cell.

Figure 3A:
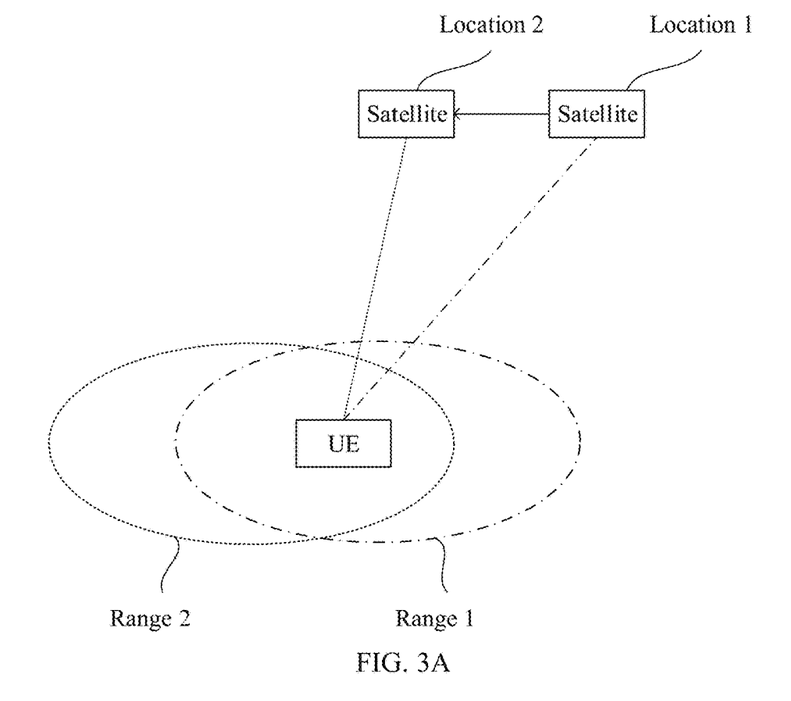
FIG. 3A is a schematic diagram of a mobile cell.

For the mobile cell, as the satellite moves, coverage of the cell on the ground also moves. FIG. 3A is a schematic diagram of the mobile cell. As shown in FIG. 3A, when the satellite is at a location 1, a coverage range of the cell is a range 1. When the satellite is at a location 2, a coverage range of the cell is a range 2. When the satellite moves from the location 1 to the location 2, the coverage range of the cell corresponding to the satellite changes from the range 1 to the range 2. As shown in FIG. 3A, a coverage status corresponding to the range 1 is different from that corresponding to the range 2. When the cell mode is the mobile cell, implementation of the satellite is relatively simple. An antenna tilt angle of the satellite towards the ground may remain unchanged. However, implementation of the terminal device is relatively complex.

Figure 3B:
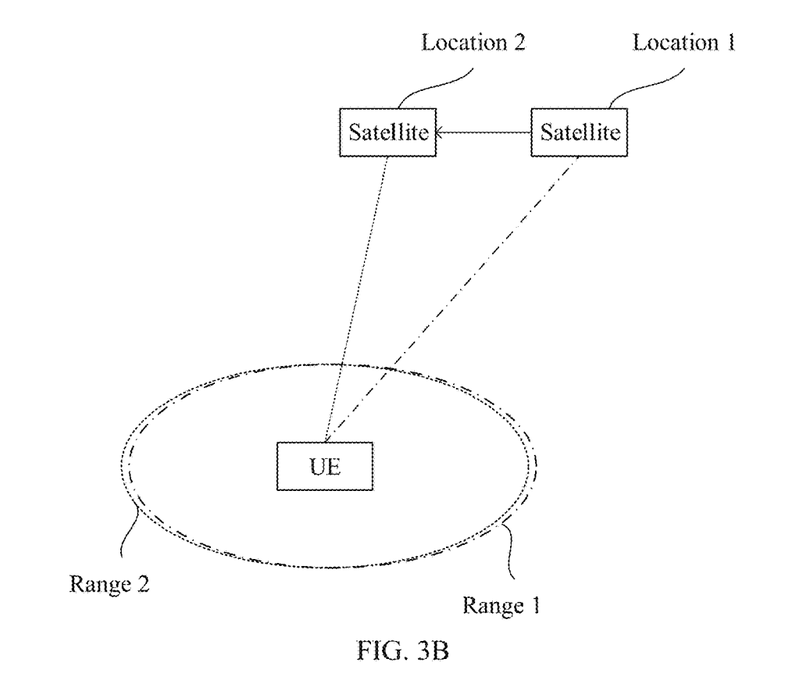
FIG. 3B is a schematic diagram of a fixed cell.

For the fixed cell, coverage of the cell is stationary as the satellite moves. In other words, as the satellite moves, a coverage range of the cell remains almost unchanged. FIG. 3B is a schematic diagram of the fixed cell. When the satellite is at a location 1, a coverage range of the cell is a range 1. When the satellite is at a location 2, a coverage range of the cell is a range 2. As shown in FIG. 3B, a coverage status corresponding to the range 1 is almost the same as that corresponding to the range 2. When the cell mode is the fixed cell, implementation of the satellite is relatively complex. The antenna tilt angle of the satellite towards the ground is required to be adjusted depending on a physical location of the satellite. However, implementation of a terminal device is relatively simple.

It should be noted that the foregoing satellite division manner and cell division manner are independent of each other. In other words, the two division manners may be randomly combined. For example, there may be following four combinations: bent-pipe mode+mobile cell; bent-pipe mode+fixed cell; regenerative mode+mobile cell; and regenerative mode+fixed cell.

Switch Between Satellites

Since a satellite is mobile, a terminal device that does not move may be served with shift satellites. The mode of bent-pipe mode+fixed cell is used as an example. Some communication protocols (for example, 3GPP protocols) use a solution with a physical cell ID (PCI) remaining unchanged. For a terminal device, as an old satellite moves out, and a new satellite moves in, a base station may remain unchanged, and all configurations (including a PCI) used for a cell may remain unchanged. In this solution, only a repeater is changed, but changing the repeater does not involve any modifications to a protocol stack. Based on this, such a process may be referred to as a handover, but cannot be considered as a handover in a strict sense.

Figure 4:
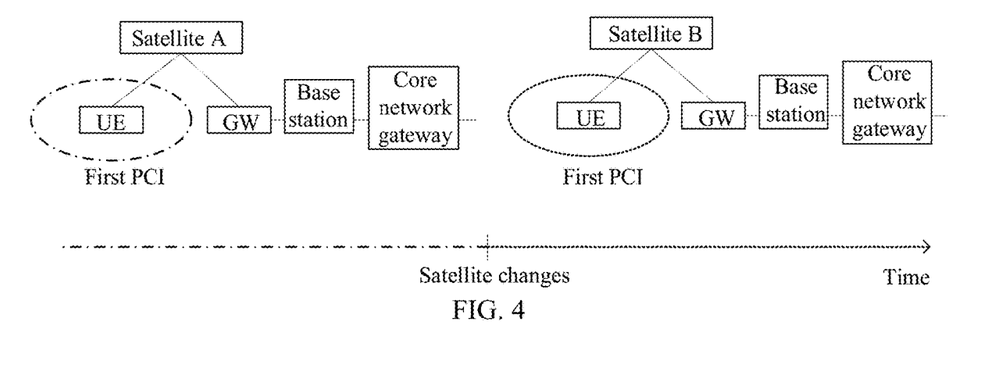
FIG. 4 is a schematic diagram of a switch between satellites with a PCI remaining unchanged.

FIG. 4 is a schematic diagram of a switch between satellites with a PCI remaining unchanged. Before a satellite change instant on a time axis, the terminal device (represented by a UE in FIG. 4) is connected to a satellite A, and a PCI of a cell corresponding to the satellite A is a first PCI. After the satellite change instant, the base station switches from the satellite A to a satellite B, and the terminal device starts to transmit data by using the satellite B. A PCI of a cell corresponding to the satellite B remains unchanged, and is still the first PCI. The satellite A may also be referred to as an old satellite, and the satellite B may also be referred to as a new satellite. Although the satellite is changed, since all configurations of the base station remain unchanged, all wireless configuration parameters of the terminal device may remain unchanged.

Ephemeris Information

In a related technology, an NTN cell may notify, by using ephemeris information, a terminal device of related location information of a satellite. The terminal device may infer a current location of the satellite based on the ephemeris information. The ephemeris information may be transmitted by using a system information block (SIB) 19.

Figure 5:
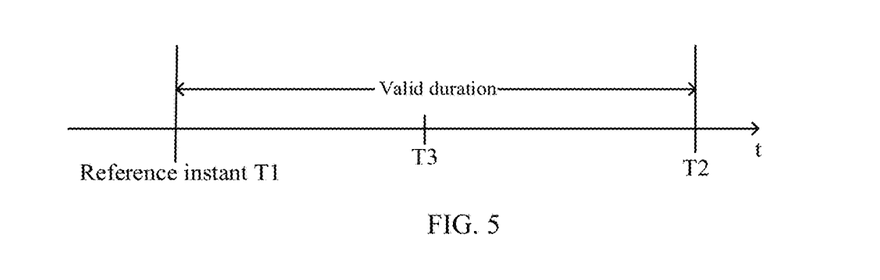
FIG. 5 is an example diagram of ephemeris information.

In some embodiments, the ephemeris information may include one or more of following: a reference instant, a change parameter, and a valid duration. As shown in FIG. 5, the ephemeris information obtained by the terminal device includes a reference instant T1, a valid duration (T2-T1) of the ephemeris information, and a change parameter. Based on these information, the terminal device may calculate a location of the satellite at any instant within a time period from T1 to T2. For example, for an instant T3, the terminal device may determine a location of the satellite at the instant T3 based on a location of the satellite at the instant T1, duration (T3-T1) of a time period from the instant T3 to the reference instant T1, and the change parameter.

It should be noted that a network device may provide the ephemeris information to the terminal device before the reference instant, or may provide the ephemeris information to the terminal device after the reference instant. In addition, before current ephemeris information expires, the network device may provide updated ephemeris information to the terminal device.

Figure 6:
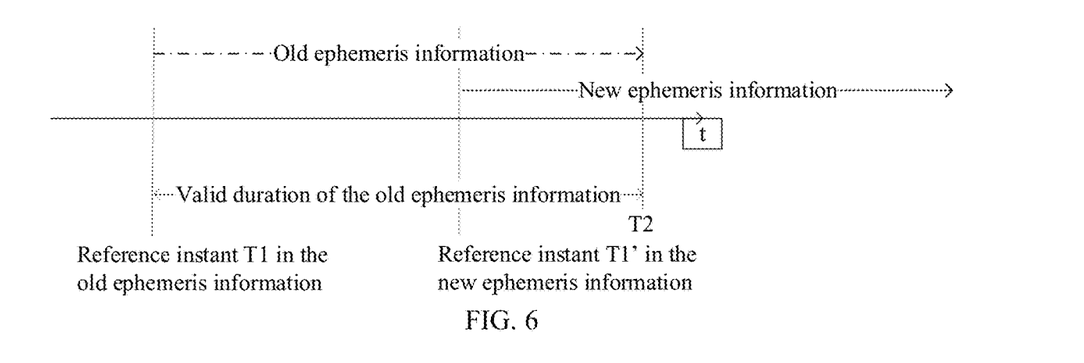
FIG. 6 is a schematic diagram of an ephemeris information update.

FIG. 6 is a schematic diagram of providing, by the network device, new ephemeris information before the current ephemeris information expires. For ease of differentiation, ephemeris information before updating is referred to as old ephemeris information, and the updated ephemeris information is referred to as new ephemeris information. As shown in FIG. 6, the old ephemeris information expires at an instant T2. Before the instant T2, the network device may provide new ephemeris information to the terminal device. A reference instant in the new ephemeris information is T1'. Therefore, within a time period from T1' to T2, the terminal device has two pieces of ephemeris information available. In a case that the terminal device calculates a physical location of the satellite based on the ephemeris information, although physical locations of the same satellite calculated based on the two pieces of ephemeris information are not necessarily identical, they may be considered as valid and equivalent within a certain precision range. Therefore, the terminal device may randomly select one piece of ephemeris information for use.

In the handover solution with the PCI remaining unchanged as shown in FIG. 4, a wireless configuration parameter of the cell with the first PCI may remain unchanged, and a wireless configuration parameter of the terminal device may remain unchanged. However, ephemeris information corresponding to the satellite A may be different from that corresponding to the satellite B. To accelerate a handover procedure, for example, a procedure in which a serving satellite of the cell with the first PCI changes from the satellite A to the satellite B, it is stipulated in some communication protocols (for example, 3GPP protocols) that ephemeris information of a next satellite serving the cell, such as the ephemeris information of the satellite B, may be provided to the terminal device in advance.

Figure 7A:
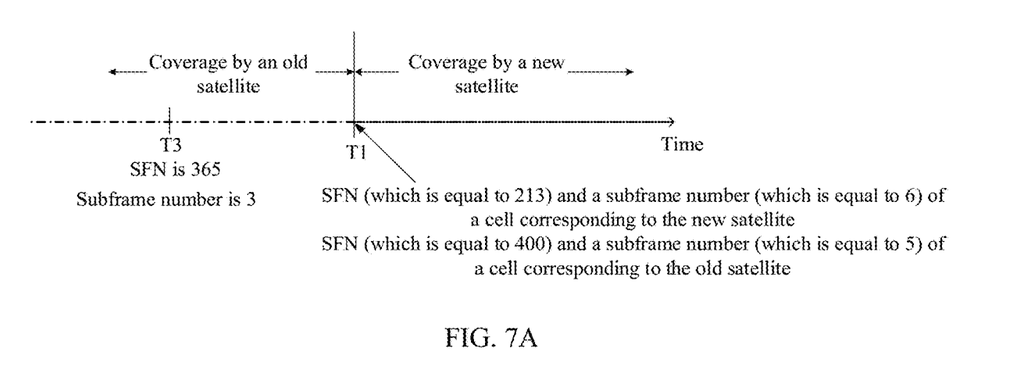
FIG. 7A is an example diagram of a satellite coverage status in a same geographic area.
Figure 7B:
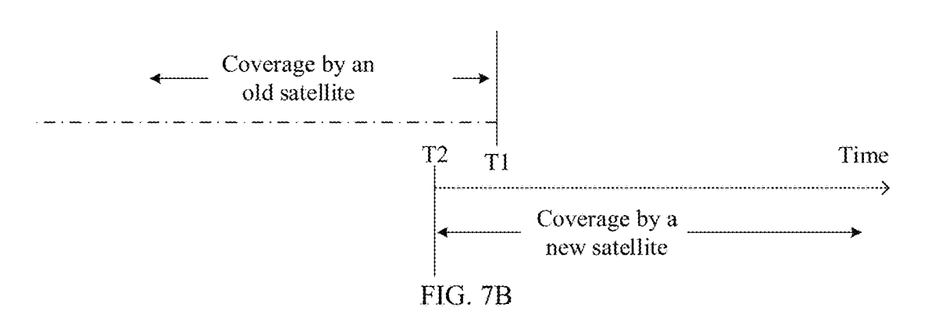
FIG. 7B is an example diagram of another satellite coverage status in a same geographic area.
Figure 7C:
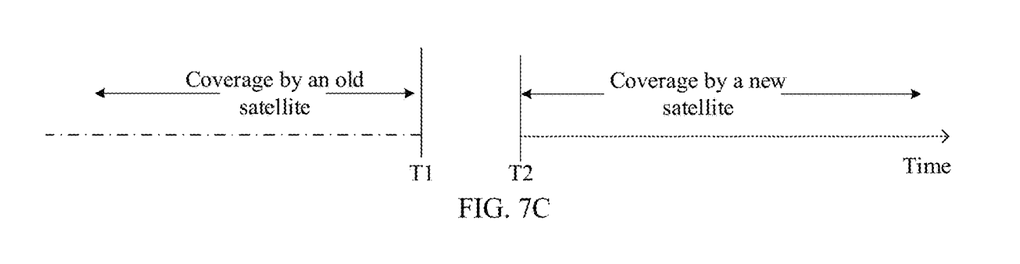
FIG. 7C is an example diagram of still another satellite coverage status in a same geographic area.

In a case that two satellites (which may be referred to as an old satellite and a new satellite) successively cover a same geographic area, for a relationship between a time at which the geographic area (hereinafter referred to as a first area) is covered by the new satellite and a time at which the geographic area is covered by the old satellite, there may be three cases, as shown in FIG. 7A to FIG. 7C.

Referring to FIG. 7A, a signal from the old satellite stops covering the first area at an instant T1, and a signal from the new satellite starts covering the first area at the instant T1, that is, the instant at which the signal from the old satellite stops covering the first area is equal to the instant at which the signal from the new satellite starts covering the first area. In this case, when notifying the terminal device of ephemeris information of the new satellite, the network device may indicate a reference instant of the new satellite by using a system frame number (SFN) and a subframe number of a cell corresponding to the old satellite. For example, the network device may notify the terminal device of the ephemeris information of the new satellite by using the cell corresponding to the old satellite. An SFN and a subframe number corresponding to a reference instant T3 in the ephemeris information of the new satellite are 365 and 3, respectively. When receiving the ephemeris information of the new satellite, the terminal device may consider an instant, corresponding to the SFN which is equal to 365 and the subframe number which is equal to 3, as the reference instant T3 in the ephemeris information of the new satellite.

Timing of using the ephemeris information of the new satellite is associated with the time at which the new satellite covers the first area. Before the new satellite covers the first area, the ephemeris information of the new satellite may not be used. In FIG. 7A, an instant T1 corresponds to the SFN (which is equal to 400) and the subframe number (which is equal to 5) of the cell corresponding to the old satellite, and the instant T1 corresponds to an SFN (which is equal to 213) and a subframe number (which is equal to 6) of a cell corresponding to the new satellite. After the new satellite starts covering the first area, that is, after the instant T1, the terminal device may use the ephemeris information of the new satellite, and the terminal device communicates with the network device by using the new satellite.

Referring to FIG. 7B, a signal from the old satellite stops covering the first area at an instant T1, and a signal from the new satellite starts covering the first area at an instant T2, that is, the instant at which the signal from the old satellite stops covering the first area is later than the instant at which the signal from the new satellite starts covering the first area. In this case, the network device may provide the ephemeris information of the new satellite to the terminal device by using a method similar to that in FIG. 7A, for example, indicate the reference instant in the ephemeris information of the new satellite by using the SFN and the subframe number of the cell corresponding to the old satellite.

Referring to FIG. 7C, a signal from the old satellite stops covering the first area at an instant T1, and a signal from the new satellite starts covering the first area at an instant T2, that is, the instant at which the signal from the old satellite stops covering the first area is earlier than the instant at which the signal from the new satellite starts covering the first area.

In some cases, the reference instant in the ephemeris information of the new satellite is before the instant T1, that is, the reference instant is within a coverage time period of the old satellite. In this case, the network device may provide the ephemeris information of the new satellite to the terminal device by using a method similar to that in FIG. 7A, for example, indicate the reference instant in the ephemeris information of the new satellite by using the SFN and the subframe number of the cell corresponding to the old satellite.

In some other cases, the reference instant in the ephemeris information of the new satellite may be after the instant T1 and before the instant T2, that is, the reference instant is within a time interval between a coverage time period of the old satellite and a coverage time period of the new satellite. Within the time interval, the terminal device is provided with no network coverage, or the terminal device has no radio signal. Therefore, there is no corresponding radio frame number and corresponding subframe number for the first area at the reference instant of the new satellite, and therefore, the terminal device cannot be notified of the reference instant in the ephemeris information of the new satellite by using a method similar to that in FIG. 7A. In this way, the terminal device cannot obtain the ephemeris information of the new satellite in a timely manner, which may lengthen the communication interruption.

Therefore, in different scenarios, for example, in a case that no network coverage is provided, how to indicate the ephemeris information of the new satellite is a problem that needs to be resolved.

Figure 8:
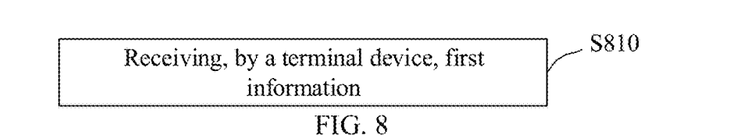
FIG. 8 is a schematic flowchart of a method for wireless communication according to an embodiment of the present application.

FIG. 8 is a schematic flowchart of a method for wireless communication according to an embodiment of the present application, to solve the foregoing problem. The following describes in detail, with reference to FIG. 8, the method provided in this embodiment of the present application.

The method shown in FIG. 8 may be applied to the plurality of scenarios mentioned above. For example, the method shown in FIG. 8 may be applied to the scenario in which the old satellite and the new satellite successively cover the same geographic area, such as the scenarios shown in FIG. 7A and FIG. 7B. For another example, the method shown in FIG. 8 may also be applied to the scenario in which the old satellite and the new satellite do not cover the same geographic area successively, such as the scenario shown in FIG. 7C.

When a serving satellite of a serving cell (that is, a first cell) of the terminal device changes from an old satellite (hereinafter may be referred to as a first satellite) to a new satellite (hereinafter may be referred to as a second satellite), although configuration information corresponding to the first cell may remain unchanged, time information, such as an SFN and a subframe number, of the first cell may change. For ease of differentiation, time information of the first cell when the cell is served by the first satellite may be referred to as time information, corresponding to the first satellite, of the first cell, and time information of the first cell when the cell is served by the second satellite may be referred to as time information, corresponding to the second satellite, of the first cell.

The method shown in FIG. 8 may include step S810. In step S810, the terminal device receives first information.

The first information may be used to indicate ephemeris information of the second satellite. The second satellite may be the new satellite mentioned above, or a next serving satellite of the first cell. The first cell may be a current serving cell of the terminal device. A current serving satellite of the first cell may be the old satellite mentioned above, that is, the first satellite. In other words, the first satellite and the second satellite successively cover a same geographic area, and the geographic area corresponds to the first cell.

Ephemeris information of the second satellite is future ephemeris information of the first cell, and is not equivalent to ephemeris information of a serving satellite of a neighboring cell. The ephemeris information of the second satellite may include a reference instant, a valid duration, a change parameter, and the like that are mentioned above. In an implementation, the reference instant (that is, a first reference instant) in the ephemeris information of the second satellite may be associated with the time information of the first cell. The time information of the first cell may include, for example, an SFN, or an SFN and a subframe number. In another implementation, the first reference instant may be associated with an absolute instant. Two manners of indicating the first reference instant are described below with specific scenarios.

In some embodiments, the first reference instant may be directly indicated by the time information of the first cell, for example, the first reference instant may be indicated by the SFN of the first cell corresponding to the first satellite, or the SFN and the subframe number of the first cell. For example, the first reference instant is within a time period during which the geographic area corresponding to the first cell is provided with network coverage, and the first reference instant may be directly indicated by the SFN of the first cell corresponding to the first satellite. In an example, the first reference instant is within a time period during which the first satellite covers the first cell, and/or the first reference instant is within a time period during which the second satellite covers the first cell. In this case, the geographic area corresponding to the first cell is provided with network coverage at the first reference instant. In other words, the first reference instant is before a first instant, and/or the first reference instant is after a second instant. In this case, the geographic area corresponding to the first cell is provided with network coverage at the first reference instant. The first instant is a time at which the first satellite stops covering the first cell, and the second instant is a time at which the second satellite starts covering the first cell.

In some embodiments, the first reference instant may be inferred from the time information of the first cell. For example, the first reference instant is within a time period during which the geographic area corresponding to the first cell is not provided with network coverage, and the first reference instant may be inferred from the time information of the first cell. In an example, the first reference instant is outside a time period during which the first satellite covers the first cell, and the first reference instant is outside a time period during which the second satellite covers the first cell. In this case, the geographic area corresponding to the first cell is not provided with network coverage at the first reference instant. In other words, the first reference instant is after a first instant, and the first reference instant is before a second instant. In this case, the geographic area corresponding to the first cell is not provided with network coverage at the first reference instant.

In some embodiments, the first information may indicate the first reference instant by using a virtual SFN, or a virtual SFN and a virtual subframe number. Therefore, an instant corresponding to the virtual SFN (or the virtual SFN and the virtual subframe number), that is, the first reference instant, may be inferred from the SFN (or the SFN and the subframe number) of the first cell. The virtual SFN and/or the virtual subframe number are/is associated with the SFN and/or the subframe number of the first cell. For example, the virtual SFN may indicate an instant a duration of Ta after the SFN of the first cell as a reference. For another example, the virtual SFN and the virtual subframe number may indicate an instant a duration of Tb after the SFN and the subframe number of the first cell as a reference. It may be learned that, the virtual SFN does not correspond to an actual radio frame, and a virtual subframe is not an actual subframe. The terminal device is not covered by the first cell at the instant corresponding to the virtual SFN or corresponding to the virtual SFN and the virtual subframe number.

The virtual SFN (which may also be referred to as an equivalent SFN) may be determined based on the SFN of the first cell corresponding to the first satellite, or may be determined based on an actual SFN. For example, the virtual SFN may be determined based on an actual SFN and duration of a radio frame in a communications system. In a case that a time difference between the first reference instant and an actual SFN a is X (X may be converted into b radio frames), the virtual SFN corresponding to the first reference instant is SFN a+b. Duration corresponding to the b radio frames is equal to X, or duration corresponding to (b−1) radio frames is less than X and duration corresponding to the b radio frames is greater than X.

It should be noted that the SFN a may be any actual SFN, or the SFN a may be any SFN of the first cell when the first cell is served by the first satellite. In addition, the terminal device may not be notified of the SFN a.

As described above, the first information may indicate the first reference instant by using the virtual SFN and the virtual subframe number (which may also be referred to as an equivalent subframe number). For example, in a case that the duration corresponding to the (b−1) radio frames mentioned above is less than X, and the duration corresponding to the b radio frames is greater than X, to improve indication precision of the first reference instant, the first information further includes a virtual subframe number. The virtual subframe number may be determined based on duration of a subframe and a difference between the instant corresponding to the virtual SFN and the first reference instant. A method for determining the virtual subframe number is similar to the method for determining the virtual SFN. For brevity, details are not described herein again.

In a case that the first reference instant is indicated by a virtual SFN and/or subframe number, the terminal device may determine the first reference instant based on a time relationship between the virtual SFN and/or subframe number and an actual SFN and/or subframe number. For example, the terminal device may determine any actual SFN and/or subframe number as a reference frame, and then determine the first reference instant based on duration between the reference frame and the virtual SFN and/or subframe number. In an example, the reference frame may be an instant at which the first satellite stops covering the first cell, that is, an SFN and a subframe number, corresponding to the first instant, of the first cell. In another example, the terminal device may determine the first reference instant by using a first timer. A start time of the first timer is the instant corresponding to the reference frame, timing duration of the first timer is duration between the reference frame and the virtual SFN and/or subframe number, and a timeout instant of the timer is the first reference instant.

In some embodiments, the first information may indicate the first reference instant by using a second reference instant and first duration, for example, first reference instant=second reference instant+first duration. For example, in a case that the geographic area corresponding to the first cell is provided with no network coverage at the first reference instant, the first reference instant may be indicated by the second reference instant and the first duration. For another example, in a case that the geographic area corresponding to the first cell is provided with network coverage at the first reference instant, the first reference instant may be indicated by the second reference instant and the first duration.

The second reference instant may be associated with the time information of the first cell corresponding to the first satellite. For example, the second reference instant may be the SFN and/or the subframe number of the first cell corresponding to the first satellite. Alternatively, the second reference instant may be an absolute instant.

In a case that the first reference instant is indicated by the second reference instant and the first duration, the terminal device may determine the first reference instant based on a second timer. A start time of the second timer is the second reference instant, timing duration of the second timer is the first duration, and a timeout instant of the second timer is the first reference instant.

In some embodiments, the first reference instant may be associated with an absolute instant, that is, the first reference instant may be indicated by the absolute instant. For example, the absolute instant may be represented by one or more of following: year, month, day, hour, minute, second, millisecond, and microsecond. In an example, the first reference instant may be represented as 7:47:45.244 on Oct. 23, 2023.

In a case that the first reference instant is associated with the absolute instant, after receiving the ephemeris information of the second satellite, the terminal device needs to determine a time compensation value for performing data transmission by the terminal device by using the second satellite. For example, the terminal device is to perform data transmission at an SFN X by using the second satellite, and the terminal device may determine, based on an absolute instant corresponding to the SFN X and the first reference instant, the time compensation value, for example, a difference between the absolute instant corresponding to the SFN X and the first reference instant.

In some embodiments, before the serving satellite of the first cell changes from the first satellite to the second satellite, the terminal device may receive the first information, that is, the ephemeris information of the second satellite. For example, when a signal from the first satellite covers the terminal device, the terminal device may receive the ephemeris information of the second satellite. Before the second satellite covers the first cell, obtaining the ephemeris information of the second satellite helps to shorten communication interruption caused by a satellite handover.

In some embodiments, the terminal device may receive the first information transmitted by the network device, or the network device may transmit the first information to the terminal device.

In some embodiments, the first information may be carried in a radio resource control (RRC) message or an SIB message, or the first information is a dedicated RRC message or SIB message. For example, the SIB message may be used to indicate the foregoing information to the terminal device in an idle state, an inactive state, or a connected state. The dedicated RRC message may be used to indicate the foregoing information to the terminal device in the connected state.

In this embodiment of the present application, the reference instant in the ephemeris information of the second satellite may be inferred from the time information of the first cell corresponding to the first satellite, or the reference instant in the ephemeris information of the second satellite may be indicated by the absolute instant. In this way, the terminal device may obtain the ephemeris information of the new satellite before the new satellite provides coverage, and can transmit information by using the new satellite immediately after the new satellite provides coverage, thereby helping to shorten communication interruption.

As mentioned above, to ensure normal communication of the NTN system, the terminal device may receive the ephemeris information of the serving satellite (that is, the first satellite). Before the ephemeris information of the first satellite expires, the terminal device may receive new ephemeris information, so as to update the ephemeris information of the first satellite. In this embodiment of the present application, the terminal device may receive the ephemeris information of the second satellite. Therefore, the terminal device may receive a plurality of pieces of ephemeris information, and how to determine whether first ephemeris information received by the terminal device is the ephemeris information of the second satellite needs to be resolved.

To resolve the foregoing problem, in this embodiment of the present application, the terminal device may determine, based on a first condition, whether the first ephemeris information is the ephemeris information of the second satellite, thereby helping the terminal device identify received ephemeris information.

In some embodiments, the first condition may be related to one or more of following: a message associated with the first ephemeris information; first indication information; a relationship between a reference instant in the first ephemeris information and a first instant; and time associated with the first ephemeris information, where the first indication information indicates whether the first ephemeris information is the ephemeris information of the second satellite.

In some embodiments, the first condition may be related to the message associated with the first ephemeris information. The message associated with the first ephemeris information may be a message of the first ephemeris information or a message of a message that carries the first ephemeris information.

For example, the first condition includes: in a case that the message associated with the first ephemeris information is a first type, the first ephemeris information being ephemeris information of the first satellite; and in a case that the message associated with the first ephemeris information is a second type, the first ephemeris information being the ephemeris information of the second satellite. In other words, in this embodiment of the present application, which satellite is associated with the first ephemeris information may be determined by defining the message associated with the ephemeris information of the first satellite and the message associated with the ephemeris information of the second satellite, which is easy to implement.

For another example, the first condition may be: in a case that the message associated with the first ephemeris information is the first type, the first ephemeris information is the ephemeris information of the first satellite. In other words, in a case that the message associated with the first ephemeris information is not the first type, the first ephemeris information is the ephemeris information of the second satellite.

For another example, the first condition may be: in a case that the message associated with the first ephemeris information is the second type, the first ephemeris information is the ephemeris information of the second satellite. In other words, in a case that the message associated with the first ephemeris information is not the second type, the first ephemeris information is the ephemeris information of the first satellite.

In other words, in this embodiment of the present application, which satellite is associated with the first ephemeris information may alternatively be determined by defining only the message associated with the ephemeris information of the first satellite or only the message associated with the ephemeris information of the second satellite, thereby helping to reduce overheads.

In an example, a message of the first type may be an SIB19, and/or a message of the second type may be another SIB message different from the SIB19, for example, the message of the second type may be an SIB 99. Certainly, the message of the second type may alternatively be another type of message defined in the future. In a case that only the first type SIB 19 is defined in the first condition, first ephemeris information received on the SIB19 is the ephemeris information of the first satellite, and first ephemeris information received from another message is the ephemeris information of the second satellite.

In some embodiments, the first condition may be related to the first indication information, that is, the first indication information may indicate whether the first ephemeris information is the ephemeris information of the first satellite or the ephemeris information of the second satellite.

A manner of indication by the first indication information is not limited in the present application. For example, the first indication information may belong to the first ephemeris information. Alternatively, the first indication information and the first ephemeris information may be carried in different messages.

In some embodiments, the first indication information may be carried in a first bit. In other words, the first indication information may be represented by one bit. For example, the first indication information may be represented by one bit in the first ephemeris information. In a possible implementation, when a value of the first bit is 0, the first ephemeris information is the ephemeris information of the first satellite, or the first ephemeris information is not the ephemeris information of the second satellite. When a value of the first bit is 1, the first ephemeris information is the ephemeris information of the second satellite, or the first ephemeris information is not the ephemeris information of the first satellite. In another possible implementation, when a value of the first bit is 1, the first ephemeris information is the ephemeris information of the first satellite, or the first ephemeris information is not the ephemeris information of the second satellite. When a value of the first bit is 0, the first ephemeris information is the ephemeris information of the second satellite, or the first ephemeris information is not the ephemeris information of the first satellite.

In some embodiments, the first indication information may be carried in a first parameter. The first parameter may be a Boolean parameter. In other words, the first indication information may be indicated by a Boolean parameter. For example, the first parameter may be one parameter in the first ephemeris information. A value of the first parameter may be true or false. In a possible implementation, when a value of the first parameter is true, the first ephemeris information is the ephemeris information of the first satellite, or the first ephemeris information is not the ephemeris information of the second satellite. When a value of the first parameter is false, the first ephemeris information is the ephemeris information of the second satellite, or the first ephemeris information is not the ephemeris information of the first satellite. In another possible implementation, when a value of the first parameter is false, the first ephemeris information is the ephemeris information of the first satellite, or the first ephemeris information is not the ephemeris information of the second satellite. When a value of the first parameter is true, the first ephemeris information is the ephemeris information of the second satellite, or the first ephemeris information is not the ephemeris information of the first satellite.

In some embodiments, the first indication information may be optional, that is, the first indication information may exist or may not exist. For example, when the first indication information exists in the first ephemeris information, whether the first ephemeris information is the ephemeris information of the first satellite or the ephemeris information of the second satellite is determined based on the first indication information. For another example, when the first indication information does not exist in the first ephemeris information, it may be considered that the first ephemeris information is the ephemeris information of the first satellite or the ephemeris information of the second satellite. In an example, in a case that the first indication information does not exist in the first ephemeris information, the first ephemeris information is the ephemeris information of the first satellite. In a case that the first indication information exists in the first ephemeris information, the first ephemeris information is the ephemeris information of the second satellite.

In some embodiments, the first condition is related to the relationship between the reference instant in the first ephemeris information and the first instant. For example, the first condition includes: in a case that the reference instant in the first ephemeris information is earlier than or equal to the first instant, the first ephemeris information being ephemeris information of the first satellite; and in a case that the reference instant in the first ephemeris information is later than the first instant, the first ephemeris information being the ephemeris information of the second satellite.

In some embodiments, in a case that the reference instant in the first ephemeris information is within a time period during which the first satellite covers the first cell, the first ephemeris information is the ephemeris information of the first satellite. In a case that the reference instant in the first ephemeris information is outside a time period during which the first satellite covers the first cell, the first ephemeris information is the ephemeris information of the second satellite. For example, in a case that the reference instant in the first ephemeris information is after a time period during which the first satellite covers the first cell, the first ephemeris information is the ephemeris information of the second satellite.

In some embodiments, in a case that the geographic area corresponding to the first cell is provided with no network coverage at the reference instant in the first ephemeris information, the first ephemeris information is the ephemeris information of the second satellite. For example, in a case that the reference instant in the first ephemeris information is after the first instant, and the reference instant in the first ephemeris information is before a second instant, the first ephemeris information is the ephemeris information of the second satellite.

In some embodiments, the first condition may be related to the time associated with the first ephemeris information. The time associated with the first ephemeris information may be a time of the reference instant in the first ephemeris information.

The time may include, for example, an absolute time and/or the time information of the first cell. For example, the first condition is: in a case that the time associated with the first ephemeris information is the absolute time, the first ephemeris information is the ephemeris information of the second satellite. For another example, the first condition is: in a case that the time associated with the first ephemeris information is the time information of the first cell when the first satellite covers the first cell, the first ephemeris information is the ephemeris information of the first satellite, or is not the ephemeris information of the second satellite.

When the first satellite covers the first cell, the time information of the first cell may be, for example, the SFN of the first cell corresponding to the first satellite, or the SFN and the subframe number of the first cell. The SFN and the subframe number mentioned here are an actual SFN and an actual subframe number of the first cell, or are not a virtual SFN and a virtual subframe number mentioned above.

For another example, the time may include an actual SFN and/or subframe number of the first cell and a virtual SFN and/or subframe number of the first cell. For example, the first condition is: in a case that the time associated with the first ephemeris information is a virtual SFN and/or subframe number, the first ephemeris information is the ephemeris information of the second satellite. Alternatively, in a case that the time associated with the first ephemeris information is inferred from the time information of the first cell, the first ephemeris information is the ephemeris information of the second satellite.

In some embodiments, the ephemeris information of the first satellite and the ephemeris information of the second satellite may be carried in different messages, or may be carried in a same message. The terminal device may determine the first condition based on different manners of carrying the ephemeris information.

For example, when the ephemeris information of the first satellite and the ephemeris information of the second satellite are carried in different messages, the first condition may be related to one or more of the first indication information, the message associated with the first ephemeris information, the relationship between the reference instant in the first ephemeris information and the first instant, and the time associated with the first ephemeris information that are mentioned above.

For another example, when the ephemeris information of the first satellite and the ephemeris information of the second satellite are carried in a same message, the first condition may be related to one or more of the first indication information, the relationship between the reference instant in the first ephemeris information and the first instant, and the time associated with the first ephemeris information that are mentioned above. In some embodiments, the terminal device may receive an instant at which the second satellite starts to provide coverage, that is, a third instant. Therefore, the terminal device may search for, from an instant at which the second satellite starts to provide coverage, a synchronization signal block (SSB) for the first cell corresponding to the second satellite, to perform downlink synchronization.

In some embodiments, the terminal device may receive second information transmitted by the network device, or the network device may transmit the second information to the terminal device. The second information may be used to indicate a third instant. For example, the third instant may be inferred from the time information of the first cell. For another example, the third instant may be associated with an absolute instant. The time information of the first cell mentioned here may include the SFN of the first cell, or the SFN and the subframe number of the first cell. Similar to the foregoing method, the second information may indicate the third instant by using the virtual SFN and/or subframe number of the first cell corresponding to the first satellite. For meanings and using methods of the virtual SFN and/or subframe number, reference may be made to the foregoing description. For brevity, details are not described herein again.

The two alternatives provided in the embodiments of the present application are exemplarily described with reference to FIG. 9 and FIG. 10.

Figure 9:
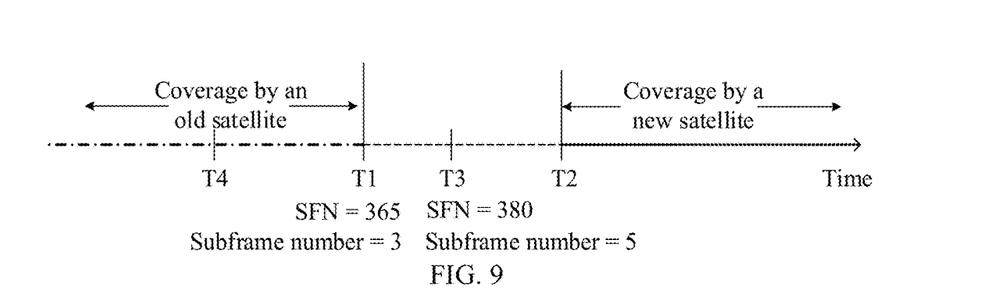
FIG. 9 is an example diagram of an association between a first reference instant and time information of a first cell.

FIG. 9 is an example diagram of an association between the first reference instant and the time information of the first cell. Referring to FIG. 9, the first satellite stops covering the first cell at a first instant T1 (SFN=365, and subframe number=3), the second satellite starts covering a second cell from a second instant T2, and the first reference instant T3 is between the first instant and the second instant.

When the first satellite serves the first cell, the network device transmits the ephemeris information of the second satellite to the terminal device at an instant T4. In the ephemeris information of the second satellite, the first reference instant T3 is an SFN which is equal to 380 and a subframe number which is equal to 5. The system frame number and the subframe number mentioned herein, corresponding to the first reference instant, of the first cell are a virtual frame number and a virtual subframe number, respectively.

When the terminal device receives the ephemeris information of the second satellite, the terminal device may consider, as the first reference instant, an instant 150 ms (that is, duration of 15 radio frames) plus 2 ms (that is, duration of two subframes) after the first instant (that is, the reference frame mentioned above). The 15 radio frames are a difference between the SFN corresponding to the first reference instant and the SFN corresponding to the first instant, and the two subframes are a difference between the subframe number corresponding to the first reference instant and the subframe number corresponding to the first instant. The foregoing method may be implemented based on an internal clock of the terminal device.

Figure 10:
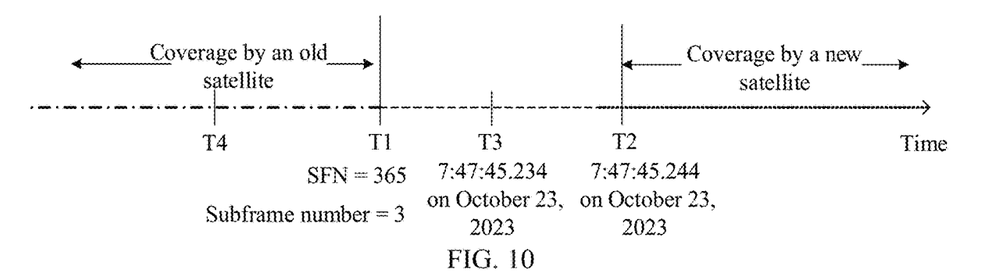
FIG. 10 is an example diagram of an association between a first reference instant and an absolute instant.

FIG. 10 is an example diagram of an association between the first reference instant and the absolute instant. Referring to FIG. 10, the first satellite stops covering the first cell at a first instant T1 (SFN=365, and subframe number=3), the second satellite starts covering a second cell from a second instant T2 (7:47:45.244 on Oct. 23, 2023), and the first reference instant T3 is between the first instant and the second instant.

When the first satellite serves the first cell, the network device transmits the ephemeris information of the second satellite to the terminal device at an instant T4. In the ephemeris information of the second satellite, the first reference instant T3 is 7:47:45.234 on Oct. 23, 2023.

After receiving the ephemeris information of the second satellite, the terminal device needs to determine a time compensation value for performing data transmission by the terminal device by using the second satellite. In a case that the terminal device performs data transmission at 7:47:45.254 on Oct. 23, 2023, it is considered that a time difference between the current instant and the first reference instant is 20 milliseconds.

In a "handover" procedure with the PCI remaining unchanged, in a case that coverage of the two satellites is discontinuous, the method provided in this embodiment of the present application may enable the terminal device to obtain ephemeris information of a new satellite in advance. Therefore, immediately after an instant at which the new satellite starts providing coverage, the terminal device may start to transmit an uplink signal by using the new satellite, which helps to reduce a delay caused by communication interruption.

The foregoing describes the method embodiments of the present application in detail. The following describes apparatus embodiments of the present application in detail. It should be understood that the description of the method embodiments corresponds to the description of the apparatus embodiments, and therefore, for a part that is not described in detail, reference may be made to the foregoing method embodiments.

Figure 11:
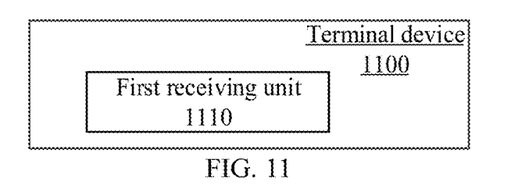
FIG. 11 is a schematic structural diagram of a terminal device according to an embodiment of the present application.

FIG. 11 is a schematic structural diagram of a terminal device according to an embodiment of the present application. The terminal device 1100 includes a first receiving unit 1110.

The first receiving unit 1110 is configured to receive first information, where the first information indicates ephemeris information of a second satellite, the ephemeris information of the second satellite includes a first reference instant, and the first reference instant is inferred from time information of a first cell, or the first reference instant is associated with an absolute instant, where the first cell is a serving cell of the terminal device, a first satellite is currently serving the first cell, and the second satellite is to serve the first cell subsequently.

In some embodiments, the time information of the first cell includes a system frame number SFN of the first cell, or an SFN and a subframe number of the first cell.

In some embodiments, the first information indicates the first reference instant by using a virtual SFN, or a virtual SFN and a virtual subframe number, where the virtual SFN is associated with the SFN of the first cell, and/or the virtual subframe number is associated with the subframe number of the first cell.

In some embodiments, the first reference instant is located after a first instant, the first reference instant is located before a second instant, the first instant is a time at which the first satellite stops covering the first cell, and the second instant is a time at which the second satellite starts covering the first cell.

In some embodiments, the first information is carried in an RRC message or an SIB message.

In some embodiments, the terminal device determines, based on a first condition, whether received first ephemeris information is the ephemeris information of the second satellite, and the first condition is related to one or more of following: a message associated with the first ephemeris information; first indication information; a relationship between a reference instant in the first ephemeris information and a first instant; and time associated with the first ephemeris information. The first indication information indicates whether the first ephemeris information is the ephemeris information of the second satellite. The first instant is a time at which the first satellite stops covering the first cell.

In some embodiments, the first condition is related to the message associated with the first ephemeris information, and the first condition includes: in a case that the message associated with the first ephemeris information is a first type, the first ephemeris information being ephemeris information of the first satellite; and/or in a case that the message associated with the first ephemeris information is a second type, the first ephemeris information being the ephemeris information of the second satellite.

In some embodiments, a message of the first type is a system message block SIB19, and a message of the second type is another SIB message different from the SIB19.

In some embodiments, the first condition is related to the relationship between the reference instant in the first ephemeris information and the first instant, and the first condition includes: in a case that the reference instant in the first ephemeris information is earlier than or equal to the first instant, the first ephemeris information being ephemeris information of the first satellite; and in a case that the reference instant in the first ephemeris information is later than the first instant, the first ephemeris information being the ephemeris information of the second satellite.

In some embodiments, the first condition is related to the time associated with the first ephemeris information, and the first condition includes: in a case that the time associated with the first ephemeris information is an absolute time, the first ephemeris information being the ephemeris information of the second satellite.

In some embodiments, the device further includes a second receiving unit, receiving second information, where the second information indicates a third instant. The third instant is inferred from the time information of the first cell, or the third instant is associated with an absolute instant.

Figure 12:
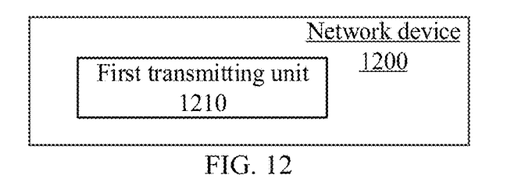
FIG. 12 is a schematic structural diagram of a network device according to an embodiment of the present application.

FIG. 12 is a schematic structural diagram of a network device according to an embodiment of the present application. The network device 1200 may include a first transmitting unit 1210.

The first transmitting unit 1210 is configured to transmit first information to a terminal device, where the first information indicates ephemeris information of a second satellite. The ephemeris information of the second satellite includes a first reference instant, and the first reference instant is inferred from time information of a first cell, or the first reference instant is associated with an absolute instant. The first cell is a serving cell of the terminal device, a first satellite is currently serving the first cell, and the second satellite is to serve the first cell subsequently.

In some embodiments, the time information of the first cell includes a system frame number SFN of the first cell, or an SFN and a subframe number of the first cell.

In some embodiments, the first information indicates the first reference instant by using a virtual SFN, or a virtual SFN and a virtual subframe number, where the virtual SFN is associated with the SFN of the first cell, and/or the virtual subframe number is associated with the subframe number of the first cell.

In some embodiments, the first reference instant is located after a first instant, the first reference instant is located before a second instant, the first instant is a time at which the first satellite stops covering the first cell, and the second instant is a time at which the second satellite starts covering the first cell.

In some embodiments, the first information is carried in an RRC message or an SIB message.

In some embodiments, the terminal device determines, based on a first condition, whether received first ephemeris information is the ephemeris information of the second satellite, and the first condition is related to one or more of following: a message associated with the first ephemeris information; first indication information; a relationship between a reference instant in the first ephemeris information and a first instant; and time associated with the first ephemeris information. The first indication information indicates whether the first ephemeris information is the ephemeris information of the second satellite. The first instant is a time at which the first satellite stops covering the first cell.

In some embodiments, the first condition is related to the message associated with the first ephemeris information, and the first condition includes: in a case that the message associated with the first ephemeris information is a first type, the first ephemeris information being ephemeris information of the first satellite; and/or in a case that the message associated with the first ephemeris information is a second type, the first ephemeris information being the ephemeris information of the second satellite.

In some embodiments, a message of the first type is a system message block SIB19, and a message of the second type is another SIB message different from the SIB19.

In some embodiments, the first condition is related to the relationship between the reference instant in the first ephemeris information and the first instant, and the first condition includes: in a case that the reference instant in the first ephemeris information is earlier than or equal to the first instant, the first ephemeris information being ephemeris information of the first satellite; and in a case that the reference instant in the first ephemeris information is later than the first instant, the first ephemeris information being the ephemeris information of the second satellite.

In some embodiments, the first condition is related to the time associated with the first ephemeris information, and the first condition includes: in a case that the time associated with the first ephemeris information is an absolute time, the first ephemeris information being the ephemeris information of the second satellite.

In some embodiments, the device further includes a second transmitting unit, transmitting second information to the terminal device, where the second information indicates a third instant. The third instant is inferred from the time information of the first cell, or the third instant is associated with an absolute instant.

Figure 13:
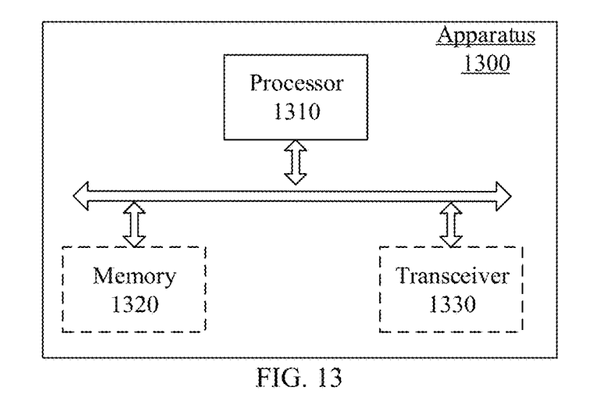
FIG. 13 is a schematic structural diagram of an apparatus for communication according to an embodiment of the present application.

In an optional embodiment, the first receiving unit 1110 and the first transmitting unit 1210 may be implemented as a transceiver 1330, and a communications apparatus 1300 may further include a processor 1310 and a memory 1320, which are specifically shown in FIG. 13.

FIG. 13 is a schematic structural diagram of an apparatus for communication according to an embodiment of the present application. Dashed lines in FIG. 13 indicate that the unit or module is optional. The apparatus 1300 may be configured to implement the method described in the foregoing method embodiments. The apparatus 1300 may be a chip, a terminal device, or a network device.

The apparatus 1300 may include one or more processors 1310. The processor 1310 may support the apparatus 1300 to implement the method described in the foregoing method embodiments. The processor 1310 may be a general-purpose processor or a dedicated processor. For example, the processor may be a central processing unit (CPU). Alternatively, the processor may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The apparatus 1300 may further include one or more memories 1320. The memory 1320 stores a program, where the program may be executed by the processor 1310, to cause the processor 1310 to execute the methods described in the foregoing method embodiments. The memory 1320 may be separate from the processor 1310 or may be integrated into the processor 1310.

The apparatus 1300 may further include a transceiver 1330. The processor 1310 may communicate with another device or chip through the transceiver 1330. For example, the processor 1310 may transmit data to and receive data from another device or chip by using the transceiver 1330.

An embodiment of the present application further provides a computer-readable storage medium for storing a program. The computer-readable storage medium may be applied to a terminal or a network device provided in embodiments of the present application, and the program causes a computer to execute the methods to be executed by the terminal or the network device in various embodiments of the present application.

An embodiment of the present application further provides a computer program product. The computer program product includes a program. The computer program product may be applied to a terminal or a network device provided in embodiments of the present application, and the program causes a computer to execute the methods to be executed by the terminal or the network device in various embodiments of the present application.

An embodiment of the present application further provides a computer program. The computer program may be applied to a terminal or a network device provided in embodiments of the present application, and the computer program causes a computer to execute the methods to be executed by the terminal or the network device in various embodiments of the present application.

It should be understood that the terms "system" and "network" in the present application may be used interchangeably. In addition, the terms used in the present application are only used to explain the specific embodiments of the present application, and are not intended to limit the present application. The terms "first", "second", "third", "fourth", and the like in the specification, claims, and drawings of the present application are used to distinguish between different objects, rather than to describe a specific order. In addition, the terms "include" and "have" and any variations thereof are intended to cover a non-exclusive inclusion.

In embodiments of the present application, the "indication" mentioned may be a direct indication or an indirect indication, or indicate an association. For example, if A indicates B, it may mean that A directly indicates B, for example, B may be obtained from A. Alternatively, it may mean that A indicates B indirectly, for example, A indicates C, and B may be obtained from C. Alternatively, it may mean that there is an association relationship between A and B.

In embodiments of the present application, "B corresponding to A" means that B is associated with A, and B may be determined based on A. However, it should be further understood that, determining B based on A does not mean determining B based only on A, but instead, B may be determined based on A and/or other information.

In the embodiments of the present application, the term "correspond" may mean that there is a direct or indirect correspondence between the two, or may mean that there is an association relationship between the two, or may mean that there is a relationship such as indicating and being indicated, or configuring and being configured.

In embodiments of the present application, the "predefined" or "preconfigured" may be implemented in a manner in which corresponding code, a table, or other related information that may be used for indication is pre-stored in a device (for example, including a terminal device and a network device). A specific implementation thereof is not limited in the present application. For example, predefined may refer to being defined in a protocol.

In embodiments of the present application, the "protocol" may refer to a standard protocol in the communications field, and may include, for example, an LTE protocol, an NR protocol, and a related protocol applied to a future communications system, which is not limited in the present application.

In the embodiments of the present application, the term "and/or" is merely an association relationship that describes associated objects, and represents that there may be three relationships. For example, A and/or B may represent three cases: only A exists, both A and B exist, and only B exists. In addition, the character "/" in the specification generally indicates an "or" relationship between the associated objects.

In the embodiments of the present application, the "include" may refer to direct inclusion, or may refer to indirect inclusion. Optionally, the term "include" mentioned in the embodiments of the present application may be replaced with "indicate" or "be used to". For example, A including B may be replaced with that A indicates B, or A is used to determine B.

In embodiments of the present application, sequence numbers of the foregoing processes do not mean execution sequences. The execution sequences of the processes should be determined according to functions and internal logic of the processes, and should not be construed as any limitation on the implementation processes of embodiments of the present application.

In several embodiments provided in the present application, it should be understood that, the disclosed system, apparatus, and method may be implemented in other manners. For example, the apparatus embodiments described above are merely examples. For example, the unit division is merely logical function division and may be other division in actual implementation. For example, a plurality of units or components may be combined or integrated into another system, or some features may be ignored or not executed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected depending on actual requirements to achieve the objectives of the solutions in the embodiments.

In addition, function units in embodiments of the present application may be integrated into one processing unit, or each of the units may exist alone physically, or two or more units may be integrated into one unit.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center via a wired (such as a coaxial cable, an optical fiber, and a digital subscriber line (DSL)) manner or a wireless (such as infrared, wireless, and microwave) manner. The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for wireless communication, comprising:
receiving, by a terminal device, first information and second information, wherein the first information indicates ephemeris information of a second satellite, the ephemeris information of the second satellite comprises a first reference instant, and the first reference instant is inferred from time information of a first cell corresponding to a first satellite, wherein the second information indicates an instant, wherein the instant is a time at which the second satellite starts serving the first cell, wherein the instant is associated with an absolute instant,
wherein the first cell is a serving cell of the terminal device, the first cell is associated with the first satellite that currently serves the first cell and the second satellite that is to serve the first cell after the first satellite.

2. The method according to claim 1, wherein the time information of the first cell comprises a system frame number (SFN) of the first cell.

3. The method according to claim 1, wherein the first reference instant is located after a first instant, the first reference instant is located before a second instant, the first instant is a time at which the first satellite stops serving the first cell, and the second instant is a time at which the second satellite starts serving the first cell.

4. The method according to claim 1, wherein the first information is carried in a radio resource control (RRC) message or a system information block (SIB) message.

5. The method according to claim 1, wherein the terminal device determines, based on a first condition, whether received first information comprises the ephemeris information of the second satellite, and the first condition is related to one or more of following:
a message associated with the first information;
first indication information;
a relationship between a reference instant in the first information and a first instant; or
time associated with the first information,
wherein the first indication information indicates whether the first information comprises the ephemeris information of the second satellite, and the first instant is a time at which the first satellite stops serving the first cell.

6. The method according to claim 5, wherein the first condition is related to the message associated with the first information, and the first condition comprises at least one of the following:
in a case that the message associated with the first information is a first type, the first information does not include the ephemeris information of the second satellite; or
in a case that the message associated with the first information is a second type, the first information includes the ephemeris information of the second satellite.

7. The method according to claim 5, wherein the first condition is related to the time associated with the first information, and the first condition comprises:
in a case that the time associated with the first information is an absolute time, the first information comprises the ephemeris information of the second satellite.

8. A method for wireless communication, comprising:
transmitting, by a network device, first information and second information to a terminal device, wherein the first information indicates ephemeris information of a second satellite, the ephemeris information of the second satellite comprises a first reference instant, and the first reference instant is inferred from time information of a first cell corresponding to a first satellite, wherein the second information indicates an instant, wherein the instant is a time at which the second satellite starts serving the first cell, wherein the instant is associated with an absolute instant, wherein the first cell is a serving cell of the terminal device, the first cell is associated with the first satellite that currently serves the first cell and the second satellite that is to serve the first cell after the first satellite.

9. The method according to claim 8, wherein the time information of the first cell comprises a system frame number (SFN) of the first cell.

10. The method according to claim 8, wherein the first reference instant is located after a first instant, the first reference instant is located before a second instant, the first instant is a time at which the first satellite stops serving the first cell, and the second instant is a time at which the second satellite starts serving the first cell.

11. The method according to claim 8, wherein the first information is carried in a message, and
when a message is a first type, the first information does not include the ephemeris information of the second satellite; or
when the message is a second type, the first information includes the ephemeris information of the second satellite.

12. The method according to claim 8, wherein
when a time associated with the first information is an absolute time, the first information comprises the ephemeris information of the second satellite.

13. A terminal device, comprising:
at least one processor;
one or more non-transitory computer-readable storage media coupled to the at least one processor and storing programming instructions for execution by the at least one processor, wherein the programming instructions, when executed, cause the terminal device to perform operations comprising:
receiving first information and second information, wherein the first information indicates ephemeris information of a second satellite, the ephemeris information of the second satellite comprises a first reference instant, and the first reference instant is inferred from time information of a first cell corresponding to a first satellite, wherein the second information indicates an instant, wherein the instant is a time at which the second satellite starts serving the first cell, wherein the instant is associated with an absolute instant, wherein the first cell is a serving cell of the terminal device, the first cell is associated with the first satellite that currently serves the first cell and the second satellite that is to serve the first cell after the first satellite.

14. The terminal device according to claim 13, wherein the time information of the first cell comprises a system frame number (SFN) of the first cell.

15. The terminal device according to claim 13, wherein the first reference instant is located after a first instant, the first reference instant is located before a second instant, the first instant is a time at which the first satellite stops serving the first cell, and the second instant is a time at which the second satellite starts serving the first cell.

16. The terminal device according to claim 13, wherein the first information is carried in a radio resource control (RRC) message or a system information block (SIB) message.

17. The terminal device according to claim 13, wherein the terminal device determines, based on a first condition, whether received first information comprises the ephemeris information of the second satellite, and the first condition is related to one or more of following:
a message associated with the first information;
first indication information;
a relationship between a reference instant in the first information and a first instant; or
time associated with the first information,
wherein the first indication information indicates whether the first information comprises the ephemeris information of the second satellite, and the first instant is a time at which the first satellite stops serving the first cell.

18. The terminal device according to claim 17, wherein the first condition is related to the message associated with the first information, and the first condition comprises at least one of the following:
in a case that the message associated with the first information is a first type, the first information does not include the ephemeris information of the second satellite; or
in a case that the message associated with the first information is a second type, the first information includes the ephemeris information of the second satellite.

19. The terminal device according to claim 17, wherein the first condition is related to the time associated with the first information, and the first condition comprises:
in a case that the time associated with the first information is an absolute time, the first information comprises the ephemeris information of the second satellite.

* * * * *